J. W. Norcross,

Tackle Hook.

No. 2,042. Reissued Aug. 1, 1865.

Witnesses.
Geo. Busch
Wm. Gruen

Inventor.
J. W. Norcross
By Munn & Co.

N. PETERS, PHOTO-LITHOGRAPHER, WASHINGTON, D. C.

UNITED STATES PATENT OFFICE.

JOSEPH W. NORCROSS, OF MIDDLETOWN, CONNECTICUT.

IMPROVED TACKLE-HOOKS.

Specification forming part of Letters Patent No. 47,322, dated April 18, 1865; Reissue No. 2,042, dated August 1, 1865.

*To all whom it may concern:*

Be it known that I, JOSEPH W. NORCROSS, of Middletown, in the county of Middlesex and State of Connecticut, have invented a new and Improved Tackle-Hook; and I do hereby declare that the following is a full, clear, and exact description thereof, which will enable others skilled in the art to make and use the same, reference being had to the accompanying drawings, forming part of this specification, in which—

Figure 1:
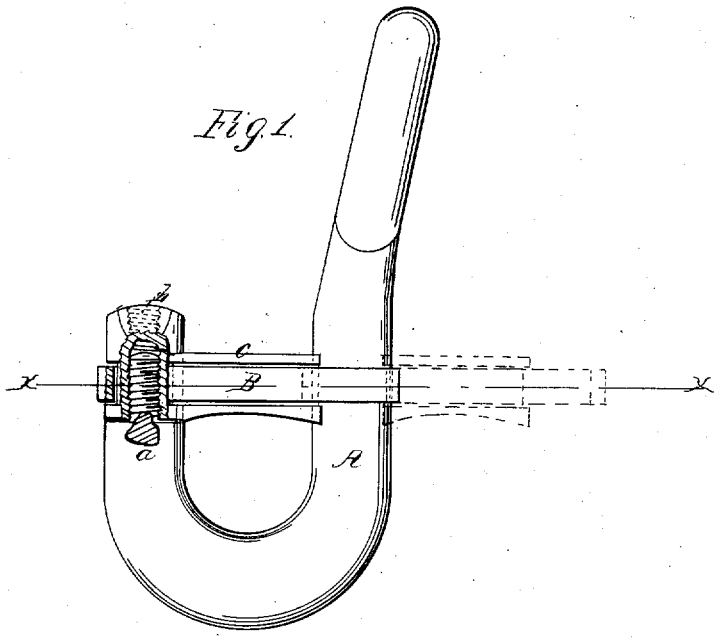
Figure 2:
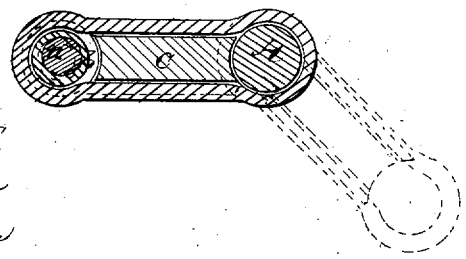

Figure 1 represents a sectional side elevation of this invention, showing the hook closed in black, and open in red, outlines. Fig. 2 is a transverse section of the same, the plane of section being indicated by the line *x x*, Fig. 1, and looking in the direction of the arrow opposite to that line.

Similar letters of reference indicate corresponding parts.

The object of this invention is to overcome two of the principal difficulties experienced in the use of the common hook—viz., the straightening of the hook and the spontaneous unhooking of the same.

The invention consists in the application of a strap or brace which swivels on the neck of the hook, and is secured to the point of the same by a screw, or other equivalent fastening, in such a manner that the lower part of the hook is converted into an eye, and the spontaneous unhooking of the same is rendered impossible, and, furthermore, by the strap the hook is prevented from binding, and consequently enabled to sustain a very heavy strain.

A represents a hook, shaped much the same as an ordinary hook and provided with a strap, B, of metal or other suitable material, which is applied to its neck so that it swivels on the same, and which catches over the point *a* of the hook, as clearly shown in the drawings. The point of the hook terminates with a short screw, on which is placed a cylindrical nut, *b*, with a circular recess to receive the strap. Between this nut and the eye of the hook may be placed a piece of metal, *c*, to fill up the space, so as to close up entirely the open space of the hook, or the strap may be made solid out of one piece of metal.

By this arrangement the lower part of the hook is converted into an eye, and it is evident that by the application of the strap B, forming the upper section of the lower eye of the hook said hook is enabled to sustain a much heavier strain than it could without said strap, for the hook cannot bend or straighten until the strap parts, and, furthermore, the hook cannot unhook spontaneously unless the strap is released from the point of the same.

It is obvious that in this arrangement the order of the screw can be reversed by making a hole for the nut in the end of the hook, and the screw to take the place of the nut, or the strap might be kept in place by a spring-catch, and the nut or screw dispensed with altogether.

What I claim as new, and desire to secure by Letters Patent, is—

The strap or brace B which forms the upper section of the lower eye of the hook A, and is made to swivel on the neck of said hook and connected to its point, substantially in the manner and for the purposes set forth.

JOSEPH W. NORCROSS.

Witnesses:

W. HAUFF,

WM. DEAN OVERELL.